US012663978B2

(12) United States Patent     (10) Patent No.:   US 12,663,978 B2

Doddaiah et al.              (45) Date of Patent:      Jun. 23, 2026

(54) MANAGING UPDATES OF DEVICE PROGRAM CODE IN INFORMATION PROCESSING SYSTEM ENVIRONMENT

(71) Applicant: Dell Products L.P., Round Rock, TX (US)

(72) Inventors: Ramesh Doddaiah, Westborough, MA (US); Udgith A. Mankad, Shrewsbury, MA (US); Theodore R. Grevers, Milford, MA (US); Suresh K. Krishnan, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 18/344,133

(22) Filed: Jun. 29, 2023

(65) Prior Publication Data

US 2025/0004747 A1     Jan. 2, 2025

(51) Int. Cl.
   *G06F 8/65*        (2018.01)
   *G06F 11/34*      (2006.01)

(52) U.S. Cl.
   CPC ............ *G06F 8/65* (2013.01); *G06F 11/3433* (2013.01)

(58) Field of Classification Search
   None
   See application file for complete search history.

(56) References Cited

U.S. PATENT DOCUMENTS

| | | | | |
|---|---|---|---|---|
| 2015/0066813 | A1* | 3/2015 | Andreatta | G06F 9/505 |
| | | | | 706/58 |
| 2016/0036656 | A1* | 2/2016 | McNutt | G06F 11/3485 |
| | | | | 709/224 |
| 2017/0161409 | A1* | 6/2017 | Martin | G06F 17/18 |
| 2017/0308705 | A1* | 10/2017 | Karaginides | G06F 8/654 |
| 2018/0011890 | A1* | 1/2018 | Yazawa | G06F 11/3058 |
| 2018/0176148 | A1* | 6/2018 | Ku | G06Q 30/0283 |
| 2020/0174773 | A1* | 6/2020 | Borlick | H04L 67/1097 |
| 2021/0365350 | A1* | 11/2021 | Fujita | G06F 9/5027 |
| 2022/0350585 | A1* | 11/2022 | Koester | G06F 9/4451 |

OTHER PUBLICATIONS

Alam, Rukshar, "Multivariate Time Series on Air Quality Data," Dec. 23, 2020, <https://medium.com/@ruksharalam99/vector-auto-regression-for-multivariate-time-series-on-air-quality-data-ce9010935726>, p. 1-19. (Year: 2020).*
Wikipedia, "Edge Computing," https://en.wikipedia.org/w/index.php?title=Edge_computing&oldid=1159916267, Jun. 13, 2023, 7 pages.
Wikipedia, "Vector Autoregression," https://en.wikipedia.org/w/index.php?title=Vector_autoregression&oldid=1158513019, Jun. 4, 2023, 8 pages.

* cited by examiner

*Primary Examiner* — Qing Chen
(74) *Attorney, Agent, or Firm* — Ryan, Mason & Lewis, LLP

(57) ABSTRACT

Techniques for program code management are disclosed. For example, a method obtains resource utilization data from a computing network comprising a plurality of computing devices. The method then utilizes a multi-variate time series model representing at least a portion of the resource utilization data to automatically compute at least one time window in which to perform a program code update on at least a subset of the plurality of computing devices.

20 Claims, 8 Drawing Sheets

100

MULTI-CLOUD COMPUTING NETWORK 103

CLOUD COMPUTING SITE 102-M

CLOUD-HOSTED APPLICATION(S) 108-M

CLOUD COMPUTING SITE 102-1

CLOUD-HOSTED APPLICATION(S) 108-1

COMMUNICATION NETWORK(S) 112

EDGE COMPUTING NETWORK 105

EDGE COMPUTING SITE 104-N

EDGE-HOSTED APPLICATION(S) 110-N

EDGE DEVICE 106-Q

EDGE DEVICE 106-P+1

EDGE COMPUTING SITE 104-1

EDGE-HOSTED APPLICATION(S) 110-1

EDGE DEVICE 106-P

EDGE DEVICE 106-1

EDGE DEVICE PROGRAM CODE UPDATE SCHEDULER 120

FIG. 1

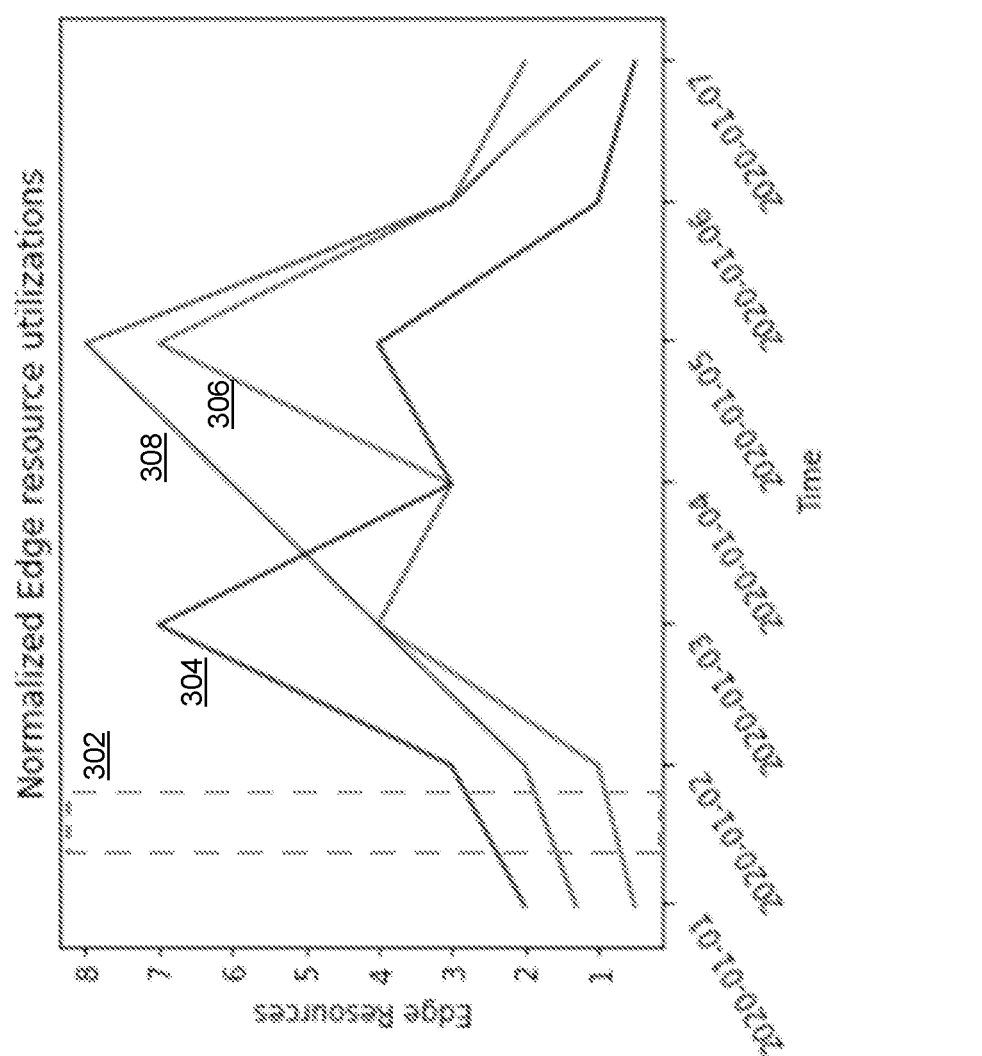
FIG. 3

400

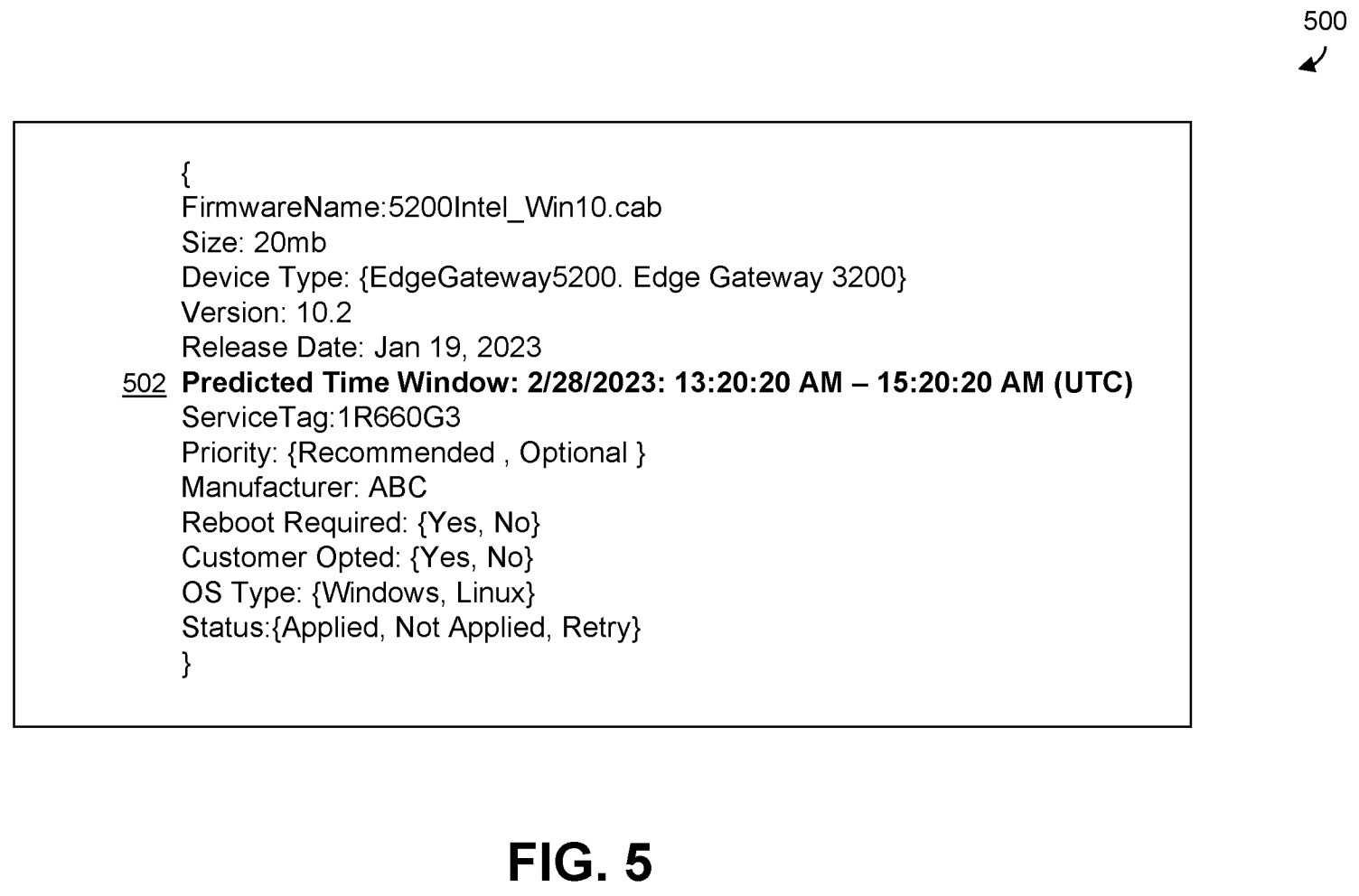

500

{
FirmwareName:5200Intel_Win10.cab
Size: 20mb
Device Type: {EdgeGateway5200. Edge Gateway 3200}
Version: 10.2
Release Date: Jan 19, 2023
502 Predicted Time Window: 2/28/2023: 13:20:20 AM – 15:20:20 AM (UTC)
ServiceTag:1R660G3
Priority: {Recommended , Optional }
Manufacturer: ABC
Reboot Required: {Yes, No}
Customer Opted: {Yes, No}
OS Type: {Windows, Linux}
Status:{Applied, Not Applied, Retry}
}

FIG. 5

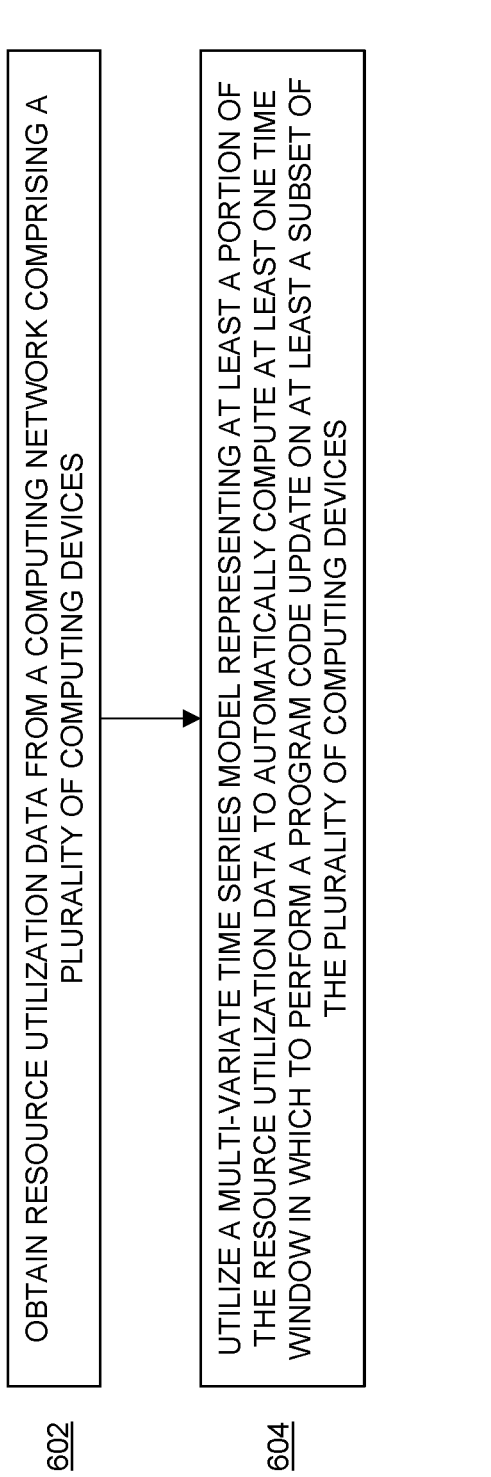

600

602   OBTAIN RESOURCE UTILIZATION DATA FROM A COMPUTING NETWORK COMPRISING A PLURALITY OF COMPUTING DEVICES

604   UTILIZE A MULTI-VARIATE TIME SERIES MODEL REPRESENTING AT LEAST A PORTION OF THE RESOURCE UTILIZATION DATA TO AUTOMATICALLY COMPUTE AT LEAST ONE TIME WINDOW IN WHICH TO PERFORM A PROGRAM CODE UPDATE ON AT LEAST A SUBSET OF THE PLURALITY OF COMPUTING DEVICES

FIG. 6

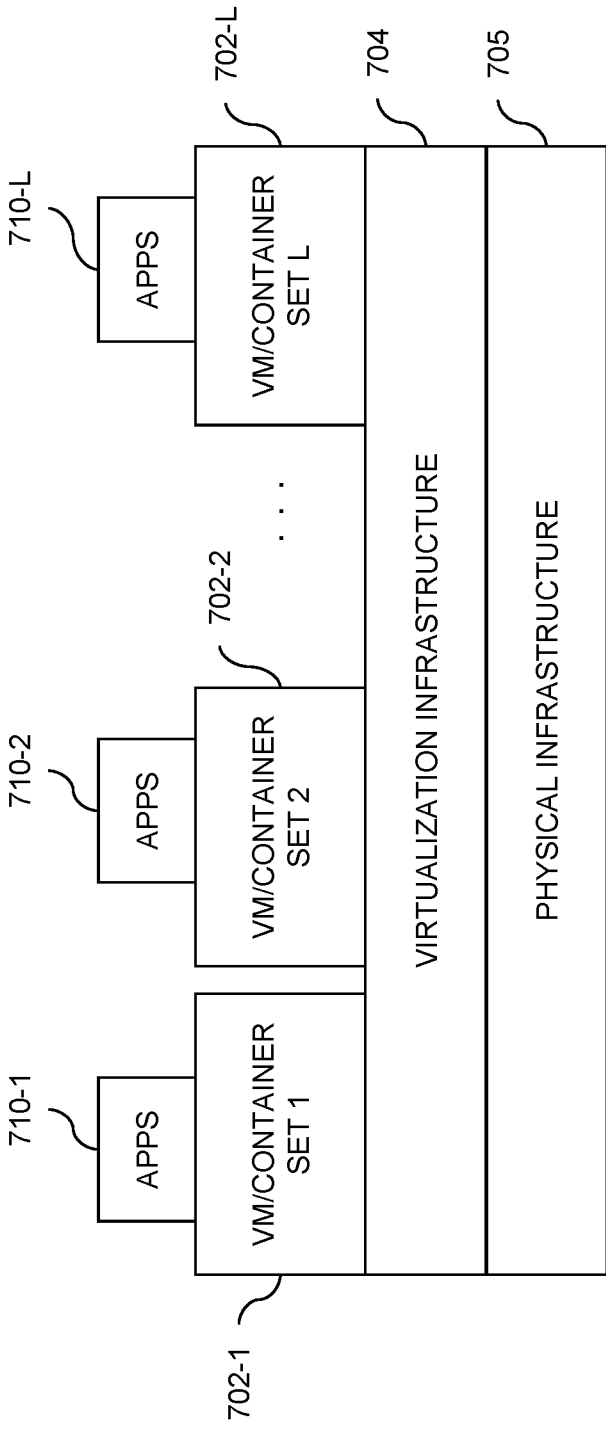
FIG. 7

MANAGING UPDATES OF DEVICE PROGRAM CODE IN INFORMATION PROCESSING SYSTEM ENVIRONMENT

FIELD

The field relates generally to information processing, and more particularly to techniques for managing information processing systems.

BACKGROUND

Information processing systems that execute application programs or, more simply, applications, are increasingly deployed in a distributed manner. For example, processing of application tasks may occur on different computing devices that can be distributed functionally and/or geographically. The information processing system environment may also comprise a large number of computing devices. Due to the large number and distributed nature of these computing devices, updating program code on each computing device can present a significant challenge.

SUMMARY

Illustrative embodiments provide program code management across a plurality of computing devices in an information processing system environment.

In one embodiment, an apparatus comprises at least one processing device comprising a processor coupled to a memory. The processing device is configured to obtain resource utilization data from a computing network comprising a plurality of computing devices. The processing device is further configured to utilize a multi-variate time series model representing at least a portion of the resource utilization data to automatically compute at least one time window in which to perform a program code update on at least a subset of the plurality of computing devices.

These and other illustrative embodiments include, without limitation, methods, apparatus, networks, systems, and processor-readable storage media.

BRIEF DESCRIPTION OF THE DRAWINGS

FIG. 1 illustrates an information processing system environment configured with program code management functionalities according to an illustrative embodiment.

FIG. 3 illustrates an exemplary representation of a time window computed for updating edge device firmware according to an illustrative embodiment.

FIG. 5 illustrates an exemplary representation of a graph database element with a firmware update time window computed according to an illustrative embodiment inserted therein.

FIG. 6 shows a methodology for program code management according to an illustrative embodiment.

FIGS. 7 and 8 illustrate examples of processing platforms that may be utilized to implement at least a portion of an information processing system in illustrative embodiments.

DETAILED DESCRIPTION

Figure 2:
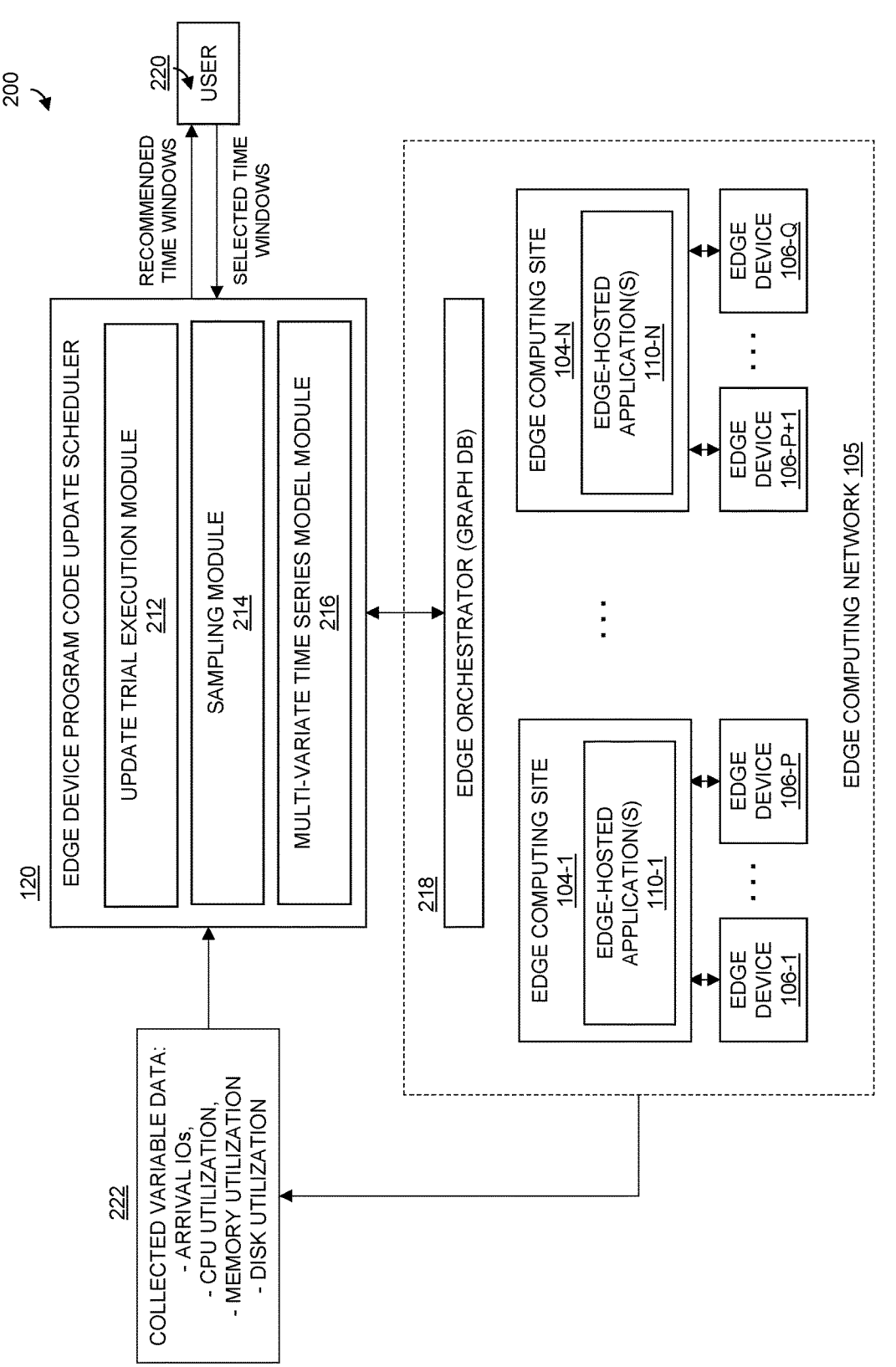
FIG. 2 illustrates an exemplary edge device program code update scheduler according to an illustrative embodiment.

As mentioned, due to the large number and distributed nature of computing devices in some information processing systems, updating program code on each computing device can present a significant challenge. By way of example only, an edge computing network typically comprises edge servers or gateways as part of edge computing sites that may each have many edge devices (e.g., edge compute endpoints such as sensors and/or other varied types of equipment) connected thereto. The edge devices are typically managed via centralized orchestration (e.g., an edge orchestrator or EO) across the different edge computing sites. In existing approaches, updates of program code, e.g., firmware, for every edge device are done manually or semi-automatically through a DevOps tool as a scheduled activity at a fixed interval for every edge device. By way of example, DevOps tools enable users to develop scripts to attempt to automate and integrate processes between software development and information technology (IT) teams.

It is realized herein that it is quite challenging, both manually and semi-automatically with DevOps tools, to update the firmware for the edge devices across all the edge computing sites with a wide variety of different vendor devices in the edge computing network. Thus, the existing firmware update process is a tedious task especially when the edge computing network is running on different time zones and the edge orchestrator (EO) needs to know the specific time window to schedule the firmware update.

Illustrative embodiments overcome the above and other drawbacks with existing program code update approaches by providing a multi-variate time series analysis solution that detects a time window to update program code across computing devices of a computing network so as to eliminate or at least minimize disruptions to the computing devices in their respective deployment environments (e.g., schedule updates when the number of workloads executing with respect to the computing network are relatively low so as not to cause, for example, device reliability issues). This detected time window may illustratively be referred to herein as optimal, substantially optimal, best, preferred, improved, and/or the like.

It is to be appreciated that illustrative embodiments will be described herein with reference to exemplary information processing systems and associated computers, servers, gateways, computing devices, storage devices, and other processing devices. It is to be appreciated, however, that embodiments are not restricted to use with the particular illustrative system and device configurations shown. Accordingly, the term "information processing system" as used herein is intended to be broadly construed.

It is to be further appreciated that the term "program code" as used herein can refer to any type of program code that a computing device can execute. Thus, in illustrative embodiments, program code refers to firmware which is a special class of program code that provides low-level control for specific hardware of a given computing device. However, program code updating functionalities contemplated by other illustrative embodiments are not limited to firmware. By way of example only, program code can refer to one or more applications or other software that executes on a computing device and can be updated.

FIG. 1 shows an information processing system environment 100 configured in accordance with an illustrative embodiment. The information processing system environment 100 is illustratively assumed to be implemented across multiple processing platforms and provides functionality for device program code updating as will be further described below.

As shown, information processing system environment 100 comprises a set of cloud computing sites 102-1 . . .

102-M (collectively, cloud computing sites 102) that collectively comprise a multi-cloud computing network 103. The cloud computing sites 102, also referred to as cloud data centers, are assumed to comprise a plurality of cloud devices or cloud nodes (not shown in FIG. 1) that run sets of cloud-hosted applications 108-1 . . . 108-M (collectively, cloud-hosted applications 108).

As further shown, information processing system environment 100 also comprises a set of edge computing sites 104-1 . . . 104-N (collectively, edge computing sites 104, also referred to as edge nodes, edge gateways and/or edge servers) that collectively comprise at least a portion of an edge computing network 105. Each of the edge computing sites 104 is assumed to comprise compute infrastructure or edge assets (not shown in FIG. 1) that run sets of edge-hosted applications 110-1 . . . 110-N(collectively, edge-hosted applications 110). As used herein, the term "application" is intended to be broadly construed to include applications, microservices, and other types of software.

Information processing system environment 100 also includes a plurality of edge devices that are coupled to each of the edge computing sites 104 as part of edge computing network 105. A set of edge devices 106-1 . . . 106-P are coupled to edge computing site 104-1, and a set of edge devices 106-P+1 . . . 106-Q are coupled to edge computing site 104-N. The edge devices 106-1, . . . 106-Q are collectively referred to as edge devices 106. Edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

Further, it is assumed that edge devices 106 each comprise program code that runs thereon such as, but not limited to, firmware, which needs to be, or otherwise should be, updated for one or more reasons (e.g., efficiency, security, new features, etc.). As mentioned herein, program code that can be updated is not limited to firmware.

Edge devices 106 in some embodiments comprise respective computers associated with a particular company, organization, or other enterprise. In addition, in some embodiments, at least portions of information processing system environment 100 may also be referred to herein as collectively comprising an "enterprise." Numerous other operating scenarios involving a wide variety of different types and arrangements of processing nodes are possible, as will be appreciated by those ordinarily skilled in the art.

Note that the number of different components referred to in FIG. 1, e.g., M, N, P, Q, can each be different numbers or some of them the same numbers. Embodiments illustrated herein are not intended to be limited to any particular numbers of components.

As shown in FIG. 1, edge computing sites 104 are connected to cloud computing sites 102 via one or more communication networks 112 (also referred to herein as networks 112). Although not explicitly shown, edge devices 106 may be coupled to the edge computing sites 104 via networks 112. Networks 112 coupling the cloud computing sites 102, edge computing sites 104 and edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network couples edge devices 106 to edge computing sites 104, while a second type of network couples the edge computing sites 104 to the cloud computing sites 102. Various other examples are possible.

In some embodiments, one or more of cloud computing sites 102 and one or more of edge computing sites 104 collectively provide at least a portion of an information technology (IT) infrastructure operated by an enterprise, where edge devices 106 are operated by users of the enterprise. The IT infrastructure comprising cloud computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of cloud computing sites 102 and/or one or more of the edge computing sites 104. A given enterprise system may host assets that are associated with multiple enterprises (e.g., two or more different businesses, organizations, or other entities). In another example embodiment, one or more of the edge computing sites 104 may be operated by enterprises that are separate from, but communicate with, enterprises which operate the one or more cloud computing sites 102.

Although not explicitly shown in FIG. 1, one or more input-output devices such as keyboards, displays or other types of input-output devices may be used to support one or more user interfaces to each of cloud computing sites 102, edge computing sites 104 and edge devices 106, as well as to support communication between each of cloud computing sites 102, edge computing sites 104, edge devices 106, and other related systems and devices not explicitly shown.

As noted above, cloud computing sites 102 host cloud-hosted applications 108 and edge computing sites 104 host edge-hosted applications 110. Edge devices 106 may exchange information with cloud-hosted applications 108 and/or edge-hosted applications 110. For example, edge devices 106 or edge-hosted applications 110 may send information to cloud-hosted applications 108. Edge devices 106 or edge-hosted applications 110 may also receive information (e.g., such as instructions) from cloud-hosted applications 108. Also, in some embodiments, it is understood that one or more edge devices 106 may execute portions or all of edge-host applications 110.

It should be noted that, in some embodiments, requests and responses or other information may be routed through multiple edge computing sites. While FIG. 1 shows an embodiment where each edge computing site 104 is connected to cloud computing sites 102 via the networks 112, this is not a requirement. In other embodiments, one or more of edge computing sites 104 may be connected to one or more of cloud computing sites 102 via one or more other ones of edge computing sites 104 (e.g., edge computing sites 104 may be arranged in a hierarchy with multiple levels, possibly including one or more edge data centers that couple edge computing sites 104 with cloud computing sites 102).

It is to be appreciated that multi-cloud computing network 103, edge computing network 105, and edge devices 106 may be collectively and illustratively referred to herein as a "multi-cloud edge platform." In some embodiments, edge computing network 105 and edge devices 106 are considered a "distributed edge system."

Still further shown in FIG. 1, information processing system environment 100 comprises an edge device program code update scheduler 120. Edge device program code update scheduler 120 is generally shown connected to edge computing network 105 meaning that edge device program code update scheduler 120 can be connected to each of edge computing sites 104, edge-hosted applications 110, edge devices 106, and one or more other components (not expressly shown in FIG. 1) that are part of or otherwise associated with edge computing network 105. In some embodiments, an EO (edge orchestrator, as explained above) and one or more edge zone controllers may be part of edge computing network 105 and, accordingly, connected to edge device program code update scheduler 120. Edge device program code update scheduler 120 is also connected to each of cloud computing sites 102, cloud-hosted applications 108, and one or more other components (not expressly shown in FIG. 1) that are part of or otherwise associated with multi-cloud computing network 103 via edge computing network 105 and the one or more communication networks 112, and/or through one or more other networks.

While edge device program code update scheduler 120 is shown as a single block connected to edge computing network 105, it is to be appreciated that, in some embodiments, parts or all of edge device program code update scheduler 120 may be implemented within edge computing network 105 and reside on one or more of the components that comprise edge computing network 105. For example, modules that constitute edge device program code update scheduler 120 may be deployed on one or more of edge computing sites 104 (e.g., edge servers or gateways), edge devices 106, and any other components not expressly shown (e.g., on a centralized edge computing node dedicated to edge device scheduling or on the same centralized edge computing node as the EO). In some alternative embodiments, one or more modules of edge device program code update scheduler 120 can even be implemented on one or more cloud computing sites 102 or otherwise external to multi-cloud computing network 103 and edge computing network 105. Further, while edge device program code update scheduler 120 is used to schedule program code updates on edge devices 106, functionalities described herein can be additionally or alternatively applied to schedule program code updates on cloud devices of multi-cloud computing network 103.

As will be explained in greater detail herein, edge device program code update scheduler 120 is configured to perform a trial run for a program code (e.g., device firmware) update on a subset of edge devices 106 to learn the time taken by the program code update (i.e., how long does it take to complete the update of the program code on each of the subset of edge devices 106). Edge device program code update scheduler 120 is further configured to perform a sampling process across varying workloads to find an average time length taken by the program code update. Edge device program code update scheduler 120 is configured to then pass the learned time length to a multi-variate time series model to forecast an optimal (or substantially optimal, best, preferred, improved, and/or the like) time window in which to update the program code on each of edge devices 106. It is to be appreciated that edge device program code update scheduler 120 also considers that the time taken by each program code update may be different on different types of edge devices 106 based on, for example, any newly added features by the manufacturer of the given type of edge device. Further details of edge device program code update scheduler 120 will be explained below in the context of FIG. 2.

Referring still to FIG. 1, in some embodiments, edge data from edge devices 106 may be stored in a database or other data store (not shown), either locally at edge computing sites 104 and/or in processed or transformed format at different endpoints (e.g., cloud computing sites 102, edge computing sites 104, other ones of edge devices 106, etc.). The database or other data store may be implemented using one or more storage systems that are part of or otherwise associated with one or more of cloud computing sites 102, edge computing sites 104, and edge devices 106. By way of example only, the storage systems may comprise a scale-out all-flash content addressable storage array or other type of storage array. The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Cloud computing sites 102, edge computing sites 104, edge devices 106, and edge device program code update scheduler 120 in the FIG. 1 embodiment are assumed to be implemented using processing devices, wherein each such processing device generally comprises at least one processor and an associated memory.

It is to be appreciated that the particular arrangement of cloud computing sites 102, edge computing sites 104, edge devices 106, cloud-hosted applications 108, edge-hosted applications 110, communications networks 112, and edge device program code update scheduler 120 illustrated in the FIG. 1 embodiment is presented by way of example only, and alternative arrangements can be used in other embodiments.

It is to be understood that the particular set of components shown in FIG. 1 is presented by way of illustrative example only, and in other embodiments additional or alternative components may be used. Thus, another embodiment may include additional or alternative systems, devices, and other network entities, as well as different arrangements of modules and other components.

Cloud computing sites 102, edge computing sites 104, edge devices 106, edge device program code update scheduler 120, and other components of the information processing system environment 100 in the FIG. 1 embodiment are assumed to be implemented using one or more processing platforms each comprising one or more processing devices having a processor coupled to a memory. Such processing devices can illustratively include particular arrangements of compute, storage, and network resources.

Cloud computing sites 102, edge computing sites 104, edge devices 106, edge device program code update scheduler 120, or components thereof, may be implemented on respective distinct processing platforms, although numerous other arrangements are possible. For example, in some embodiments at least portions of edge devices 106, edge computing sites 104, and edge device program code update scheduler 120 may be implemented on the same processing platform. One or more of edge devices 106 can therefore be implemented at least in part within at least one processing platform that implements at least a portion of edge computing sites 104. In other embodiments, one or more of edge devices 106 may be separated from but coupled to one or more of edge computing sites 104. Various other component coupling arrangements are contemplated herein.

The term "processing platform" as used herein is intended to be broadly construed so as to encompass, by way of illustration and without limitation, multiple sets of processing devices and associated storage systems that are configured to communicate over one or more networks. For example, distributed implementations of information processing system environment 100 are possible, in which certain components of the system reside in one data center in a first geographic location while other components of the system reside in one or more other data centers in one or more other geographic locations that are potentially remote from the first geographic location. Thus, it is possible in some implementations of the system for cloud computing sites 102, edge computing sites 104, edge devices 106, and edge device program code update scheduler 120, or portions or components thereof, to reside in different data centers. Distribution as used herein may also refer to functional or logical distribution rather than to only geographic or physical distribution. Numerous other distributed implementations are possible.

In some embodiments, information processing system environment 100 may be implemented in part or in whole using a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based IT organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems, as well as information processing systems other than container-based systems, can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Figure 8:
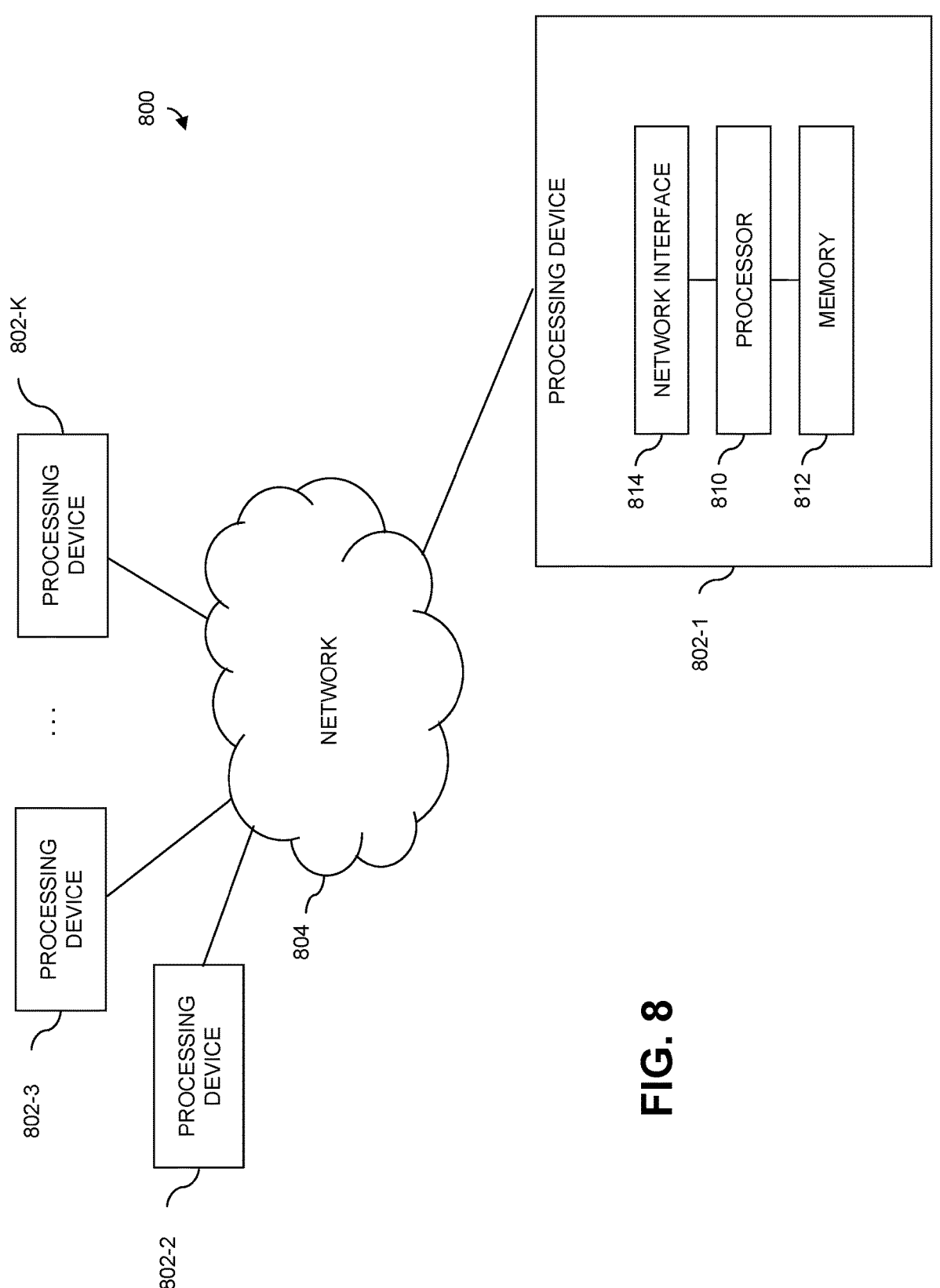

Additional examples of processing platforms utilized to implement cloud computing sites 102, edge computing sites 104, edge devices 106, edge device program code update scheduler 120, and other components of the information processing system environment 100 in illustrative embodiments will be described in more detail below in conjunction with FIGS. 7 and 8.

Referring now to FIG. 2, an information processing system environment 200 is depicted with further details of edge device program code update scheduler 120 according to an illustrative embodiment. As shown, edge device program code update scheduler 120 comprises an update trial execution module 212, a sampling module 214, and a multi-variate time series model module 216, as will be explained in further detail below. Further, as shown, edge device program code update scheduler 120 is operatively coupled to an edge orchestrator 218 which, in illustrative embodiments, is part of edge computing network 105. As mentioned, while shown as a separate block for purposes of explanation, edge device program code update scheduler 120 may be part of edge computing network 105 and/or part of edge orchestrator 218, in some illustrative embodiments. A user 220 (e.g., a computing device of a customer/system administrator and/or other another system) is also operatively coupled to edge device program code update scheduler 120. As will be further explained below, edge device program code update scheduler 120 collects variable data 222 from edge computing network 105 including, but not limited to, arrival inputs/outputs (I/O), central processing unit (CPU) utilization, memory utilization, and disk utilization. Variable data 222 comprises examples of resource utilization data.

In one or more illustrative embodiments, update trial execution module 212 causes performance of a trial run for a program code (e.g., device firmware) update on a subset of edge devices 106 to learn the time taken by the program code update. The specific edge devices 106 upon which a trial run of the program code update is caused to be executed by update trial execution module 212 can be selected by user 220. For example, user 220 can access an interface, not specifically shown, of edge device program code update scheduler 120 to make the selection of the subset of edge device 106 used in the update trial run. The subset may be selected based on any appropriate selection criteria including, but not limited to, device manufacturer, device type, device functionality, and/or the total number of edge devices 106 in edge computing network 105.

From the trial run effectuated by update trial execution module 212 on the subset of edge devices 106, sampling module 214 causes performance of a sampling across the subset of edge devices 106 that executed the trial program code update to find an average time length taken by the program code update for the subset of edge devices 106.

Note that, in some embodiments, the trial run and sampling steps can be performed on separate subsets of edge devices 106, e.g., based on the above-mentioned selection criteria of device manufacturer, device type, device functionality, and/or the total number of edge devices 106, to find the average update time length for each separate subset. Accordingly, an average update time length can be determined for edge devices 106 of each selection criteria, and/or for the entirety of the edge device 106.

The learned average update time length determined by sampling module 214 is then passed onto multi-variate time series model module 216 to forecast (predict) a time window (e.g., optimal, substantially optimal, best, preferred, improved, and/or the like) in which to update the program code on a set of edge devices 106. Again, it is to be appreciated that a time window can be determined for each subset of edge devices 106 based on the above-mentioned selection criteria.

Multi-variate time series model module 216 forecasts the time window based on variable data 222 collected by edge device program code update scheduler 120 from edge computing network 105 including, but not limited to, the following edge device resource utilization load parameters: arrival inputs/outputs (IOs), central processing unit (CPU) utilization, memory utilization, and disk utilization, as will be further explained below. Collection of variable data 222 can occur at a predetermined time interval (e.g., every second, as may be set by a system administrator).

Multi-variate time series model module 216 is configured to normalize edge device resource utilizations such as IOs, disk/memory and CPU. More particularly, in illustrative embodiments, multi-variate time series model module 216 is configured to utilize a vector auto regression (VAR) model to forecast and detect the optimal time window. A VAR model is a stochastic process model represented as a system of equations that expresses each variable as a linear function of its own past value(s) and the past value(s) of other variables. Further, a VAR model, considered a generalization of the univariate autoregressive model, comprises a vector-based equation for each variable in the system being modeled. The right-hand side of each equation, as will be evident below, includes a constant and lags of all of the variables in the system, plus an error term. Thus, in illustrative embodiments, multi-variate time series model module 216 uses a VAR model to represent the following resource utilizations:

$$IOs(t) =$$

$$a1 + w11 * IOs(t-1) + w12 * disk(t-1) + w13 * CPU(t-1) + e1(t-1)$$

$$disk(t) =$$

$$a2 + w21 * IOs(t-1) + w22 * disk(t-1) + + w23 * CPU(t-1) + e2(t-1)$$

$$CPU(t) =$$

$$a3 + w31 * IOs(t-1) + w32 * disk(t-1) + + w33 * CPU(t-1) + e3(t-1)$$

Each of IOs (t), disk (t), and CPU (t) are vectors. As with typical VAR nomenclature, terms a1, a2, and a3 are the constant terms, while terms e1, e2, and e3 are error terms. Normalization weights w11, w12, w13, w21, w22, w23, w31, w32, and w33 within the vectors for the lags can be set by a system administrator depending on the particular edge devices being modeled. Arrival IOs and disk bandwidth utilization time series influence CPU utilization, and vice-versa. Memory utilization can be part of disk utilization in the VAR model or can be represented by its own time series. Thus, multi-variate time series, as represented above, are used to model each edge device variable such as CPU utilization, IOs, memory and disk bandwidth utilization. It is to be understood that the above device variables are examples only and that other variable data (resource utilization data) can be collected and used in a VAR model by multi-variate time series model module 216 to forecast and detect the optimal time window for a program code update.

Multi-variate time series model module 216 thus considers each of the vector equations of the above VAR model to determine the influences of other resource utilization variables on a given one of the resource utilization variables based on past values for these resource utilization variables. From this determination, multi-variate time series model module 216 can forecast (predict) future values of the variables in the system, i.e., when resource utilization will be relatively low and thus conducive to performing a program code update operation. One or more forecasting criteria and techniques can be applied given the above VAR model representation.

Advantageously, as illustratively explained above, edge device program code update scheduler 120 learns, for each edge device 106, the optimal forecasted time window when the load is relatively low or, more particularly, when the CPU, IOs, memory, and disk utilizations are relatively low. The threshold limits for each of the variables can be set by the customer/system administrator (e.g., user 220) as well.

Accordingly, as shown in FIG. 2, edge device program code update scheduler 120 recommends different VAR-forecasted time windows to user 220 to enable user 220 to choose a desired time to have the program code update run. This approach advantageously keeps user 220 in the decision loop. In some embodiments, user 220 can also specify via an application programming interface (not expressly shown) if the update should be done automatically based on the time windows computed by multi-variate time series model module 216 (e.g., soft schedule) or follow a pre-defined customer schedule (e.g., hard schedule).

Referring now to FIG. 3, an exemplary representation 300 of a time window computed for updating edge device firmware is illustrated according to an illustrative embodiment. More particularly, a dotted rectangle 302 shows the recommended program code update time window when the forecast shows non-peak workloads. CPU, IO, disk time series are shown in respective plots 304, 306, and 308. Note that, in this particular example, the label "edge resources" refers to edge devices 106. However, time series utilization according to techniques described herein can additionally or alternatively be applied to other edge resources in edge computing network 105. e.g., edge servers, edge gateways, etc.

Figure 4:
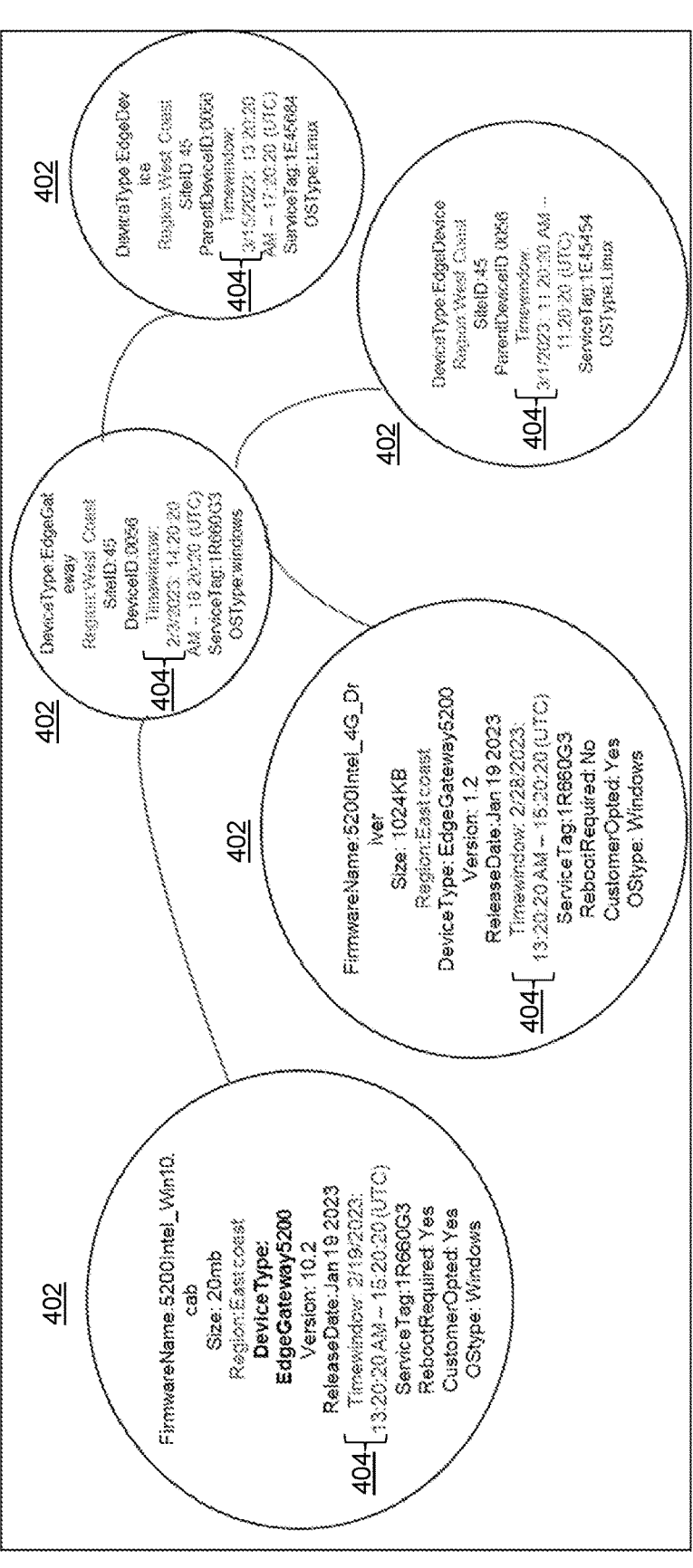
FIG. 4 illustrates an exemplary representation of elements of a graph database of an edge orchestrator with firmware update time windows computed according to an illustrative embodiment inserted therein.

Referring now to FIG. 4, an exemplary representation 400 is illustrated of elements 402 of a graph database (DB) of an edge orchestrator (e.g., edge orchestrator 218 of FIG. 2) with firmware update time windows 404, computed according to an illustrative embodiment, inserted therein. Lastly, FIG. 5 illustrates an exemplary JavaScript Object Notation (JSON)

representation 500 of a graph database element with a firmware update time window 502, computed according to an illustrative embodiment, inserted therein.

It is to be appreciated that edge orchestrator 218 maintains a global graph DB of the firmware (i.e., program code) and can pull the firmware from a support site or local repository. When new firmware is available, the graph DB is updated as shown in FIG. 4. At any time, a system administrator (user 220) can query the graph DB in edge orchestrator 218, through edge device program code update scheduler 120, to learn what firmware needs to be updated for which edge devices and see what the predicted time window computed by edge device program code update scheduler 120 is for each edge device. The graph DB maintains the status of the firmware update. Once the status is in an applied state, the record can be purged. For failed firmware updates, the update operation can be retried up to a retry threshold and edge device program code update scheduler 120 can notify the customer or system administrator (user 220).

Advantageously, as illustratively explained herein, illustrative embodiments use a multi-variate time series model to find an optimal time window to update each device firmware. Illustrative embodiments can automatically update the edge device firmware without customer involvement but can take user input into consideration to reduce the complexity of the overall process. Advantageously, a firmware update scheduler (i.e., edge device program code update scheduler 120) according to illustrative embodiments can run every new firmware update on a handful of sample edge devices to find the length of the time window needed for the latest firmware updates before it pushes these updates across hundreds or even thousands of edge devices. Illustrative embodiments, among other advantages, reduce the probability of data unavailable/data loss (DU/DL), help to complete firmware updates faster, reduce customer bandwidth and manual intervention reducing engineering time, and reduce edge administrator bandwidth. It is to be appreciated that the particular advantages described above and elsewhere herein are associated with particular illustrative embodiments and need not be present in other embodiments. Also, the particular types of information processing system features and functionality as illustrated in the drawings and described herein are exemplary only, and numerous other arrangements may be used in other embodiments.

FIG. 6 shows a methodology 600 for program code management (e.g., device program code update scheduling) according to an illustrative embodiment. More particularly, methodology 600 comprises the following steps. Step 602 obtains resource utilization data from a computing network comprising a plurality of computing devices. Step 604 utilizes a multi-variate time series model representing at least a portion of the resource utilization data to automatically compute at least one time window in which to perform a program code update on at least a subset of the plurality of computing devices.

In some embodiments, prior to utilizing the multi-variate time series model, a time length associated with the program code update may be determined. For example, the time length may be determined by executing a trial program code update on a selected subset of the plurality of computing devices, and then sampling execution results of the trial program code update to determine an average time length.

In some embodiments, the obtained resource utilization data may comprise data indicative of one or more of inputs/outputs associated with at least a portion of the computing network, a processor utilization associated with at least a portion of the computing network, a disk utilization associated with at least a portion of the computing network, and a memory utilization associated with at least a portion of the computing network. As such, the multi-variate time series model may represent a given one the inputs/outputs, the processor utilization, the disk utilization, and the memory utilization as a linear function of at least one of its own past values and at least one past value of at least one of the others of the inputs/outputs, the processor utilization, the disk utilization, and the memory utilization.

In some embodiments, the at least one computed time window may be presented to a user as a recommendation.

In some embodiments, the at least one computed time window may be provided to an orchestrator associated with the computing network to enable the orchestrator to cause the program code update to be performed on the at least a subset of the plurality of computing devices in the at least one computed time window.

In some embodiments, the at least one computed time window may be a time window determined to be concurrent with a relatively low resource utilization for the subset of the plurality of computing devices.

In some embodiments, a query from a user may be managed (e.g., received and responded to) to determine a status of the program code update with respect to at least one of the plurality of computing devices.

In some embodiments, the program code may comprise firmware associated with the subset of the plurality of computing devices.

In some embodiments, the plurality of computing devices may comprise a plurality of edge computing devices.

Illustrative embodiments of processing platforms utilized to implement functionality for program code management will now be described in greater detail with reference to FIGS. 7 and 8. Although described in the context of information processing system environments 100/200, these platforms may also be used to implement at least portions of other information processing systems in other embodiments.

FIG. 7 shows an example processing platform comprising infrastructure 700.

Infrastructure 700 comprises a combination of physical and virtual processing resources that may be utilized to implement at least a portion of the information processing system environments 100/200. Infrastructure 700 comprises multiple virtual machines (VMs) and/or container sets 702-1, 702-2 . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

Infrastructure 700 further comprises sets of applications 710-1, 710-2 . . . 710-L running on respective ones of the VMs/container sets 702-1, 702-2 . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 100 may each run on a computer, server, storage device or other processing platform element. A given such element may be viewed as an example of what is more generally referred to herein as a "processing device." Infrastructure 700 shown in FIG. 7 may represent at least a portion of one processing platform. Another example of such a processing platform is processing platform 800 shown in FIG. 8.

The processing platform 800 in this embodiment comprises at least a portion of information processing system environments 100/200 and includes a plurality of processing devices, denoted 802-1, 802-2, 802-3 . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system environments 100/200 may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for program code management as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing platform comprising at least one processor device coupled to at least one memory which stores program instructions that are executed by the at least one processor device to implement a program code update scheduling system which executes on the at least one processing platform in a computing network to perform a process for managing program code updates of a plurality of computing devices operating in the computing network, wherein in performing the process for managing program code updates of the plurality of computing devices, the program code update scheduling system operates to:

perform a trial run of a program code update for a given program code update on multiple computing devices of the plurality of computing devices to learn a time length to perform the given program code update;

collect resource utilization data for different types of resource utilization by the plurality of computing devices operating in the computing network;

utilize a multi-variate time series model representing at least a portion of the different types of resource utilization to analyze at least a portion of the collected resource utilization data and the learned time length to perform the given program code update to automatically compute at least one time window in which to automatically send a program code update to at least a subset of computing devices of the plurality of computing devices; and automatically send the program code update to the at least a subset of computing devices of the plurality of computing devices to perform the given program code update based at least in part on the automatically computed at least one time window.

2. The apparatus of claim 1, wherein:

in performing the trial run of the program code update for the given program code update on the multiple computing devices of the plurality of computing devices, the program code update scheduling system performs the trial run of the program code update on one or more subsets of computing devices of the plurality of computing devices; and each subset of the one or more subsets of computing devices of the plurality of computing devices is selected based at least in part on one or more of device manufacture, device type, device functionality, and a total number of computing devices operating in the computing network.

3. The apparatus of claim 1, wherein the learned time length to perform the given program code update is determined by the program code update scheduling system sampling results of the trial run of the program code update on the multiple computing devices of the plurality of computing devices to determine an average time length to perform the given program code update for the multiple computing devices of the plurality of computing devices.

4. The apparatus of claim 1, wherein the collected resource utilization data for the different types of resource utilization comprises data indicative of one or more of inputs/outputs associated with at least a portion of the computing network, a processor utilization associated with at least a portion of the computing network, a disk utilization associated with at least a portion of the computing network, and a memory utilization associated with at least a portion of the computing network.

5. The apparatus of claim 1, wherein the multi-variate time series model represents a given type of resource utilization of the different types of resource utilization as a linear function of at least one past value for the given type of resource utilization of the different types of resource utilization and at least one past value of at least one other type of resource utilization of the different types of resource utilization.

6. The apparatus of claim 1, wherein the program code update scheduling system further operates to present the automatically computed at least one time window to a user as a recommendation.

7. The apparatus of claim 1, wherein the program code update scheduling system further operates to provide the automatically computed at least one time window to an orchestrator associated with the computing network to enable the orchestrator to cause the program code update to be performed on the at least a subset of computing devices of the plurality of computing devices in the automatically computed at least one time window.

8. The apparatus of claim 1, wherein the automatically computed at least one time window is a time window determined to be concurrent with a resource utilization for the subset of computing devices of the plurality of computing devices.

9. The apparatus of claim 1, wherein the program code update scheduling system further operates to manage a query from a user to determine a status of the program code update with respect to at least one computing device of the plurality of computing devices.

10. The apparatus of claim 1, wherein the program code update comprises a firmware update associated with the subset of computing devices of the plurality of computing devices.

11. The apparatus of claim 1, wherein the plurality of computing devices comprise a plurality of edge computing devices.

12. A computer program product comprising a non-transitory processor-readable storage medium having stored therein one or more software programs, wherein, when executed by at least one processing device, causes the at least one processing device to implement a program code update scheduling system which executes on at least one processing platform in a computing network to perform a process for managing program code updates of a plurality of computing devices operating in the computing network, and wherein in performing the process for managing program code updates of the plurality of computing devices, the program code update scheduling system operates to:

perform a trial run of a program code update for a given program code update on multiple computing devices of the plurality of computing devices to learn a time length to perform the given program code update;

collect resource utilization data for different types of resource utilization by the plurality of computing devices operating in the computing network;

utilize a multi-variate time series model representing at least a portion of the different types of resource utilization to analyze at least a portion of the collected resource utilization data and the learned time length to perform the given program code update to automatically compute at least one time window in which to automatically send a program code update to at least a subset of computing devices of the plurality of computing devices; and automatically send the program code update to the at least a subset of computing devices of the plurality of computing devices to perform the given program code update based at least in part on the automatically computed at least one time window.

13. The computer program product of claim 12, wherein the collected resource utilization data for the different types of resource utilization comprises data indicative of one or more of inputs/outputs associated with at least a portion of the computing network, a processor utilization associated with at least a portion of the computing network, a disk utilization associated with at least a portion of the computing network, and a memory utilization associated with at least a portion of the computing network.

14. The computer program product of claim 12, wherein the multi-variate time series model represents a given type of resource utilization of the different types of resource utilization as a linear function of at least one past value for the given type of resource utilization of the different types of resource utilization and at least one past value of at least one other type of resource utilization of the different types of resource utilization.

15. The computer program product of claim 12, wherein the program code update scheduling system further operates to provide the automatically computed at least one time window to an orchestrator associated with the computing network to enable the orchestrator to cause the program code update to be performed on the at least a subset of computing devices of the plurality of computing devices in the automatically computed at least one time window.

17

16. A method comprising:

implementing a program code update scheduling system which executes on at least one processing platform in a computing network to perform a process for managing program code updates of a plurality of computing devices operating in the computing network, wherein performing the process for managing the program code updates of the plurality of computing devices comprises:

performing, by the program code update scheduling system, a trial run of a program code update for a given program code update on multiple computing devices of the plurality of computing devices to learn a time length to perform the given program code update;

collecting, by the program code update scheduling system, resource utilization data for different types of resource utilization by the plurality of computing devices operating in the computing network;

utilizing, by the program code update scheduling system, a multi-variate time series model representing at least a portion of the different types of resource utilization to analyze at least a portion of the collected resource utilization data and the learned time length to perform the given program code update to automatically compute at least one time window in which to automatically send a program code update to at least a subset of computing devices of the plurality of computing devices; and automatically sending, by the program code update scheduling system, the program code update to the at least a subset of computing devices of the plurality of computing devices to perform the given program code update based at least in part on the automatically computed at least one time window.

17. The method of claim 16, wherein the collected resource utilization data for the different types of resource utilization comprises data indicative of one or more of inputs/outputs associated with at least a portion of the computing network, a processor utilization associated with at least a portion of the computing network, a disk utilization associated with at least a portion of the computing network, and a memory utilization associated with at least a portion of the computing network.

18. The method of claim 16, wherein the multi-variate time series model represents a given type of resource utilization of the different types of resource utilization as a linear function of at least one past value for the given type of resource utilization of the different types of resource utilization and at least one past value of at least one other type of resource utilization of the different types of resource utilization.

19. The method of claim 16, wherein managing the program code updates of the plurality of computing devices further comprises providing the automatically computed at least one time window to an orchestrator associated with the computing network to enable the orchestrator to cause the program code update to be performed on the at least a subset of computing devices of the plurality of computing devices in the automatically computed at least one time window.

20. The method of claim 16, wherein the learned time length to perform the given program code update is determined by the program code update scheduling system sampling results of the trial run of the program code update on the multiple computing devices of the plurality of computing devices to determine an average time length to perform the given program code update for the multiple computing devices of the plurality of computing devices.

* * * * *